(12) United States Patent
Muramatsu

(10) Patent No.: US 6,941,067 B2
(45) Date of Patent: Sep. 6, 2005

(54) CAMERA AND MULTIPLE FLASH PHOTOGRAPHING SYSTEM

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/841,645

(22) Filed: May 10, 2004

(65) Prior Publication Data

US 2004/0234259 A1 Nov. 25, 2004

(30) Foreign Application Priority Data

May 21, 2003 (JP) ..................... 2003-143125
Oct. 17, 2003 (JP) ..................... 2003-357390

(51) Int. Cl.⁷ ............................. G03B 15/05
(52) U.S. Cl. ............... 396/61; 396/157; 396/182
(58) Field of Search .................. 396/61, 157, 182

(56) References Cited

U.S. PATENT DOCUMENTS

| 3,942,076 A | 3/1976 | Ellin .................. 361/249 |
| 4,951,073 A | 8/1990 | Slavitter .............. 396/322 |
| 6,075,947 A | * 6/2000 | Tokunaga .............. 396/157 |
| 6,512,890 B2 | * 1/2003 | Kawasaki et al. ....... 396/157 |

FOREIGN PATENT DOCUMENTS

| JP | 57-177132 | 10/1982 | |
| JP | A 57-177132 | 10/1982 | ........ G03B/15/05 |
| JP | A 58-21798 | 5/1983 | ........ H05B/41/30 |
| JP | 11-212148 | 8/1999 | |
| JP | A 11-212148 | 8/1999 | ........ G03B/15/05 |

* cited by examiner

Primary Examiner—W. B. Perkey
(74) Attorney, Agent, or Firm—Oliff & Berridge, PLC

(57) ABSTRACT

Guide numbers tgn1, tgn2 as expected light amounts of a main flashlight and a remote flashlight are added for the calculation of an expected illumination amount of each divided photometric region. If there is an over-illuminated region, among the divided photometric regions, in which the expected illumination amount exceeds a proper illumination amount for a subject, the guide numbers tgn1 and tgn2 are decreased such that of the two flashlights, the one illuminating the over-illuminated region more is given a larger decrease. In this manner, guide numbers gn1, gn2 for main flash of the main flashlight and the remote flashlight are calculated so as to adjust the expected illumination amount of the over-illuminated region to a proper value.

32 Claims, 11 Drawing Sheets

MULTIPLE FLASH PHOTOGRAPHING SYSTEM

PRIOR ART

CAMERA AND MULTIPLE FLASH PHOTOGRAPHING SYSTEM

CROSS REFERENCE TO RELATED APPLICATION

This application is based upon and claims the benefit of priority from Japanese Patent Application No. 2003-143125, filed on May 21, 2003 and No. 2003-357390, filed on Oct. 17, 2003, the entire contents of which are incorporated herein by reference.

BACKGROUND OF THE INVENTION

1. Field of the Invention

The present invention relates to a camera using a plurality of flash devices and to a multiple flash photographing system of the camera.

2. Description of the Related Art

Known cameras perform multiple flash photographing using a plurality of flashlights or the like (disclosed in, for example, Japanese Patent Application Publication Nos. Sho 58-21798, Hei 11-212148, and Sho 57-177132). In the conventional multiple flash photographing, a photometric device meters the flash from a main flash device and a remote flash device. At the metering the main and remote flash devices stop flashing when a photometric value reaches a proper value for properly illuminating a subject. This way of controlling aims to photograph the, subject with a proper exposure.

In the conventional multiple flash photographing, however, it is difficult to determine the respective optimum light amounts of the flashlights in a balanced manner because the illumination amount is controlled for the entire field irrespective of where a main subject is positioned in the field. This problem will be specifically described below with reference to FIG. 1. FIG. 1 shows an example of photometric regions and a focusing screen overlapping with each other.

For example, in a case where a person 62 and a background 63 are illuminated with a main flashlight and the background 63 is also illuminated with a remote flashlight, the effect of illumination which the main flashlight gives to the background 63 varies depending on the distance between the person 62 and the background 63. This makes it necessary for a photographer to re-set the ratio of light amounts of the main flashlight and the remote flashlight according to the distance between the person 62 and the background 63. In particular, if there is a long distance between a main subject and another subject, this may cause a trouble in shooting with a proper exposure.

SUMMARY OF THE INVENTION

It is an object of the present invention to provide a technique for easily photographing a main subject with proper exposure under any photographing condition.

It is another object of the present invention to provide a technique for easily photographing a main subject with proper exposure without the necessity for a photographer to make detailed setting.

A camera according to the present invention performs multiple flash photographing by controlling a main flash device and a remote flash device. The main flash device illuminates a subject and emits a preflash prior to a main flash. The remote flash device illuminates the subject from a position different from a position of the main flash device and emits a preflash prior to a main flash.

The camera according to the present invention includes a photometry section, a provisional flash amount calculating section, and a main flash amount calculating section.

The photometry section outputs a photometric value of each of a plurality of divided photometric regions which are formed by dividing a field. The provisional flash amount calculating section calculates a provisional expected light amount of the main flash device based on the photometric value that is obtained by the photometry section at the time the main flash device pre-flashes. Further, the provisional flash amount calculating section calculates a provisional expected light amount of the remote flash device based on the photometric value that is obtained by the photometry section at the time the remote flash device pre-flashes. The main flash amount calculating section sums up the provisional expected light amounts of the main and remote flash devices to calculate an expected illumination amount for each of the divided photometric regions. Based on the calculation, the main flash amount calculating section judges whether or not there is an over-illuminated region, among the divided photometric regions, in which the expected illumination amount exceeds a proper illumination amount. If a judgment result is positive, the main flash amount calculating section decreases the provisional expected light amounts of the main and remote flash devices to calculate expected light amounts of the main flashes of the main and remote flash devices in order to correct the expected illumination amount for the over-illuminated region to the proper illumination amount. The decreasing is done such that of the two flash devices, the one illuminating the over-illuminated area more is given a larger decrease.

Note that the photometry section may be called, for example, a photometric sensor. The provisional expected light amount of the main flash device may be called, for example, a provisional guide number tgn1. The provisional expected light amount of the remote flash device may be called, for example, a provisional guide number tgn2. The provisional flash amount calculating section may represent, for example, a function of a control device to calculate the provisional guide numbers tgn1, tgn2. The main flash amount calculating section may represent, for example, a function of the control device to calculate guide numbers gn1, gn2 of the main flash. The expected light amount of the main flash of the main flash device may be called, for example, a guide number gn1. The expected light amount of the main flash of the remote flash device may be called, for example, a guide number gn2.

The camera of the present invention is preferably configured such that when there are a plurality of the over-illuminated regions, the main flash amount calculating section calculates the expected light amounts of the main flashes of the main and remote flash devices so as to allow the illumination amount of an over-illuminated region having the largest expected illumination amount to be a proper value.

More preferably, the camera of the present invention is configured such that when there are a plurality of the over-illuminated regions, the main flash amount calculating section calculates the expected light amounts of the main flashes of the main and remote flash devices, and thereafter repeats the calculation by using the calculated expected light amounts as the provisional expected light amounts until there is no over-illuminated region.

More preferably, the camera of the present invention is configured such that when a maximum light amount of the main flash device is smaller than the provisional expected light amount thereof, the provisional flash amount calculating section underestimates the photometric value obtained at the time the main flash device pre-flashes, according to a difference between the maximum and provisional light amounts. Then, the provisional flash amount calculating section corrects the provisional expected light amount of the main flash device to the maximum light amount thereof.

More preferably, the camera of the present invention is configured such that when a maximum light amount of the remote flash device is smaller than the provisional expected light amount thereof, the provisional flash amount calculating section underestimates the photometric value obtained at the time the remote flash device pre-flashes, according to a difference between the maximum and provisional light amounts. Then, the provisional flash amount calculating section corrects the provisional expected light amount of the remote flash device to the maximum light amount of thereof.

According to one of the aspects of a multiple flash photographing system of the present invention, the multiple flash photographing system includes a main flash device, a remote flash device, a photometry section, a provisional flash amount calculating section, and a main flash amount calculating section. The main flash device illuminates a subject and emits a preflash prior to a main flash. The remote flash device illuminates the subject from a position different from a position of the main flash device and emits a preflash prior to a main flash. The photometry section outputs a photometric value of each of a plurality divided photometric regions that are formed by dividing a field. The provisional flash amount calculating section calculates a provisional expected light amount of the main flash device based on the photometric value that is obtained by the photometry section at the time the main flash device pre-flashes. Further, the provisional flash amount calculating section calculates a provisional expected light amount of the remote flash device based on the photometric value that is obtained by the photometry section at the time the remote flash device pre-flashes. The main flash amount calculating section sums up the provisional expected light amounts of the main and remote flash devices to calculate an expected illumination amount for each of the divided photometric regions. Based on the calculation, the main flash amount calculating section judges whether or not there is an over-illuminated region, among the divided photometric regions, in which the expected illumination amount exceeds a proper illumination amount. If the judgment result is positive, the main flash amount calculating section decreases the provisional expected light amounts of the main and remote flash devices to calculate expected light amounts of the main flashes of the main and remote flash devices in order to correct the expected illumination amount for the over-illuminated region to the proper illumination amount. The decreasing is done such that of the two flash devices, the one illuminating the over-illuminated area more is given a larger decrease.

Preferably, the multiple flash photographing system according to this aspect is configured such that when there are a plurality of over-illuminated regions, the main flash amount calculating section calculates the expected light amounts of the main flashes of the main and remote flash devices so as to correct the illumination amount of an over-illuminated region whose expected illumination amount is largest to the proper illumination amount.

More preferably, the multiple flash photographing system according to this aspect is configured such that when there are a plurality of the over-illuminated regions, the main flash amount calculating section calculates the expected light amounts of the main flashes of the main and remote flash devices and thereafter repeats the calculation by using the calculated expected light amounts as the provisional expected light amounts until there is no over-illuminated region.

More preferably, the multiple flash photographing system according to this aspect is configured such that when a maximum light amount of the main flash device is smaller than the provisional expected light amount thereof, the provisional flash amount calculating section underestimates the photometric value obtained at the time the main flash device pre-flashes, according to a difference between the maximum and provisional light amounts, and then corrects the provisional expected light amount of the main flash device to the maximum light amount thereof.

More preferably, the multiple flash photographing system according to this aspect is configured such that when a maximum light amount of the remote flash device is smaller than the provisional expected light amount thereof, the provisional flash amount calculating section underestimates the photometric value obtained at the time the remote flash device pre-flashes, according to a difference between the maximum and provisional light amounts, and then corrects the provisional expected light amount of the remote flash device to the maximum light amount thereof.

According to another aspect of the multiple photographing system of the present invention, the multiple photographing system performs multiple flash photographing by controlling a main flash device and a remote flash device. The main flash device illuminates a subject and emits a preflash prior to a main flash. The remote flash device illuminates the subject from a position different from a position of the main flash device and emits a preflash prior to a main flash. The multiple flash photographing system according to this aspect includes a distance information acquiring section, a photometry section, and an expected flash amount calculating section. The distance information acquiring section acquires information on a distance from the main flash device to the subject. The photometry section outputs a photometric value of each of a plurality of divided photometric regions that are formed by dividing a field. The expected flash amount calculating section calculates an expected light amount of the main flash device based on the distance information and on the photometric value that is obtained by the photometry section at the time the main flash device pre-flashes. Further, the expected flash amount calculating section calculates an expected light amount of the remote flash device based on the photometric value that is obtained by the photometry section at the time the remote flash device pre-flashes.

Preferably, the multiple flash photographing system according to this aspect is configured such that firstly, the distance information acquiring section also acquires information on a distance from the remote flash device to the subject, and secondly, the expected flash amount calculating section also uses the information on a distance from the remote flash device to the subject when calculating the expected light amount of the remote flash device. Note that the distance information acquiring section may represent, for example, a function of a distance measuring device in a camera to measure an object distance D and a function of a distance measuring section of a remote flashlight to measure a distance DH.

More preferably, the multiple flash photographing system according to this aspect is configured such that the distance information acquiring section has a distance measuring section provided in the main flash device and a distance measuring section provided in the remote flash device.

More preferably, the multiple flash photographing system according to this aspect is configured such that the expected flash amount calculating section calculates a reflection rate of the subject based on the distance information acquired by the distance information acquiring section and the photometric value obtained at the time the main flash device pre-flashes. Then, the expected amount calculating section corrects the expected light amount of the main flash device based on the reflection rate of the subject.

More preferably, the multiple flash photographing system according to this aspect is configured such that the expected flash amount calculating section calculates a reflection rate of the subject based on the distance information acquired by the distance information acquiring section and the photometric value obtained at the time the remote flash device pre-flashes. Then, the expected amount calculating section corrects the expected light amount of the remote flash device based on the reflection rate of the subject.

More preferably, the multiple flash photographing system according to this aspect is configured such that the distance information acquiring section has a lens position measuring section provided in a shooting lens. Note that the lens position measuring section may represent, for example, a function of the distance measuring device to detect a focusing position of the shooting lens with an encoder and measure the object distance.

More preferably, the multiple flash photographing system according to this aspect is configured such that the distance information acquiring section has a distance information inputting section to which a photographer inputs an arbitrary value.

More preferably, the multiple flash photographing system according to this aspect is configured such that the expected flash amount calculating section sums up the expected light amounts of the main and remote flash devices to calculate an expected illumination amount for each of the divided photometric regions. Then, the expected flash amount calculating section judges whether or not there is an over-illuminated region, among the divided photometric regions, in which the expected illumination amount exceeds a proper illumination amount. If the judgment result is positive, the expected flash amount calculating section corrects the expected light amounts of the main and remote flash devices by decreasing them. The decreasing is done such that of the two flash devices, the one illuminating the over-illuminated area more is given a larger decrease, and that the expected illumination amount of the over-illuminated region is to be the proper illumination amount.

According to still another aspect of the multiple photographing system of the present invention, the multiple photographing system performs multiple flash photographing by controlling a main flash device and a remote flash device. The main flash device illuminates a subject and emits a preflash prior to a main flash. The remote flash device illuminates the subject from a position different from a position of the main flash device and emits a preflash prior to a main flash. The multiple flash photographing system according to this aspect includes a distance information acquiring section, a photometry section, and an expected flash amount calculating section. The distance information acquiring section acquires information on a distance from the remote flash device to the subject. The photometry section outputs a photometric value of each of a plurality of divided photometric regions that are formed by dividing a field. The expected flash amount calculating section calculates an expected light amount of the main flash device based on the photometric value that is obtained by the photometry section at the time the main flash device pre-flashes. Then, the expected flash amount calculating section calculates an expected light amount of the remote flash device based on the distance information and on the photometric value that is obtained by the photometry section at the time the remote flash device pre-flashes.

More preferably, the multiple flash photographing system according to this aspect is configured such that the expected flash amount calculating section sums up the expected light amounts of the main and remote flash devices to calculate an expected illumination amount for each of the divided photometric regions. Based on the calculation, the expected flash amount calculating section judges whether or not there is an over-illuminated region among the divided photometric regions where the expected illumination amount exceeds a proper illumination amount for the subject. If the judgment result is positive, the expected flash amount calculating section corrects the expected light amounts of the main and remote flash devices by decreasing them. The decreasing is done such that of the two devices, the one illuminating the over-illuminated area more is given a larger decrease, and that the expected illumination amount of the over-illuminated region is to be the proper illumination amount.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be explained with reference to the drawings and so on.

<First Embodiment>

Figure 2:
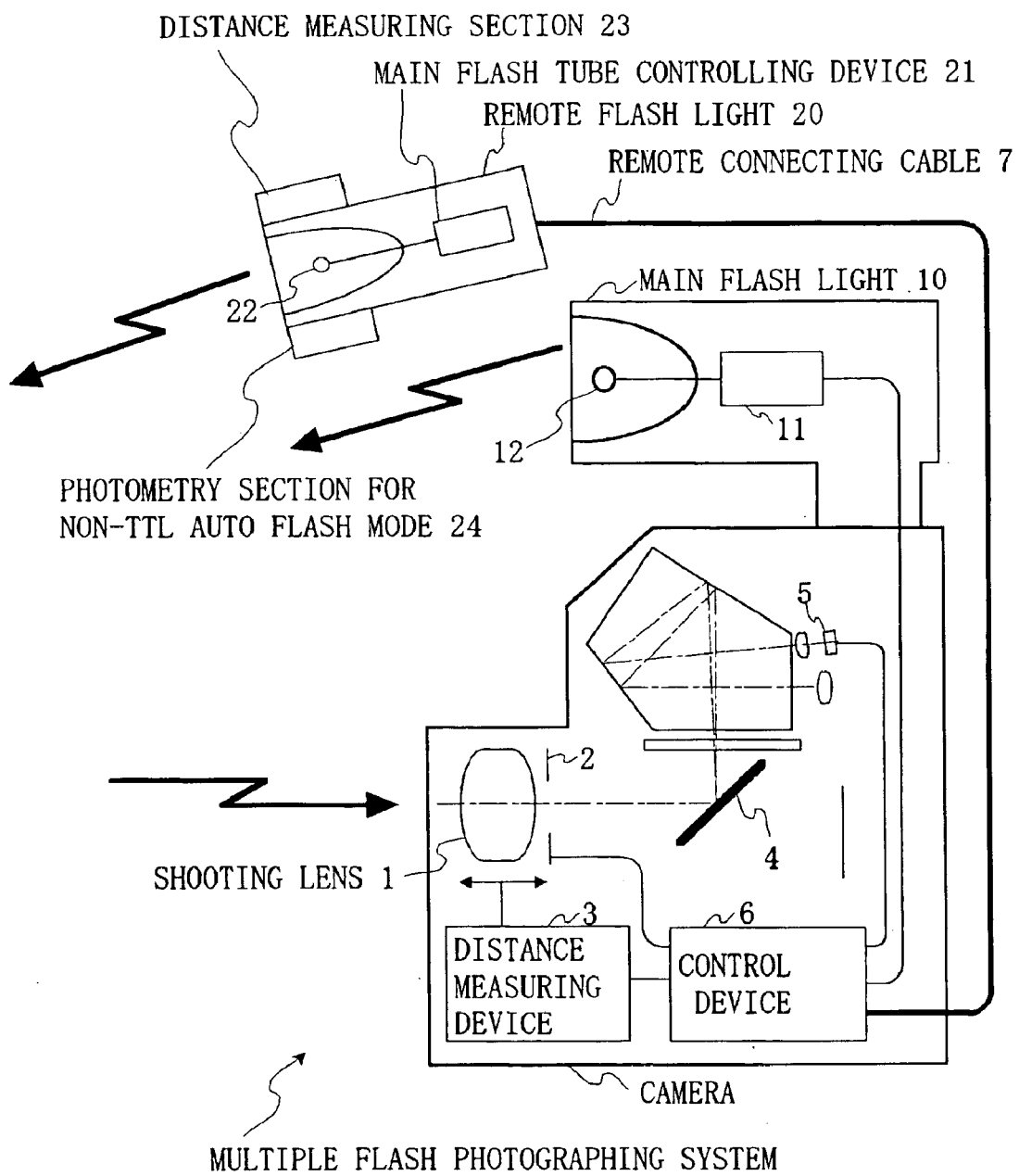
FIG. 2 is a block diagram showing an example of a photographing system of the present invention.

FIG. 2 shows the configuration of a multiple flash photographing system of this embodiment.

The multiple flash photographing system has a camera, a main flashlight 10, and a remote flashlight 20. The camera has a shooting lens 1 including an aperture 2 and a distance measuring device 3, a quick return mirror 4, a photometric sensor 5, and a control device 6. Further, the camera of this embodiment is capable of controlling the main flashlight 10 and the remote flashlight 20.

The distance measuring device 3 is an object distance measuring means composed of an encoder and so on. The distance measuring device 3 allows the encoder to detect the lens position at the time the shooting lens 1 focuses and measure the object distance.

Figure 3:
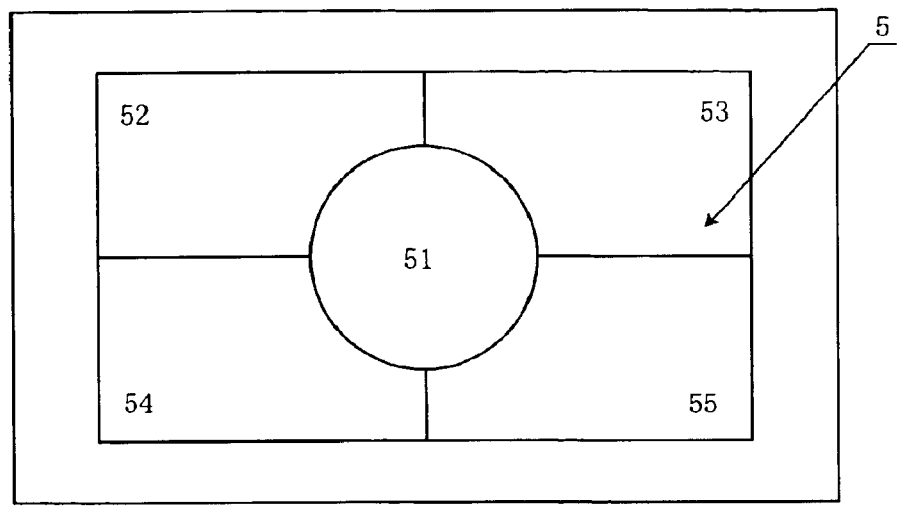
FIG. 3 is a view showing the photometric regions of the focusing screen when a photometric sensor is used.

The photometric sensor 5 divides a field of the shooting lens 1 into a plurality of photometric regions and outputs a photometric value of each of the divided photometric regions. FIG. 3 shows the photometric regions of the photometric sensor 5 on a focusing screen. The photometric sensor 5 divides the field into regions 51 to 55 to measure a light amount of each region, and transmits the measured light amounts to the control device 6.

The control device 6 including a microprocessor, controls the camera in various ways. The main flashlight 10 has a main flash tube controlling device 111 and a main flash tube 12. The main flashlight 10 is directly connected to the camera in this embodiment. Note that the main flashlight 10 is a separate unit attachable to the camera in this embodiment, however, it may be a flashlight pre-installed in the camera.

The remote flashlight 20 is a remote flash device having a remote flash tube controlling device 21, a remote flash tube 22, a distance measuring section 23, and a photometry section 24 for non-TTL auto flash mode. The remote flashlight 20 is connected to the camera via a remote connecting cable 7 in this embodiment and illuminates a subject from a position different from that of the main flashlight 10. Note that the remote flashlight 20 can be also wirelessly controlled instead of being connected to the camera via the remote connecting cable 7.

The distance measuring section 23 measures the distance from the remote flashlight 20 to the subject. The distance measuring section 23 measures the distance by an active method.

The photometry section 24 for non-TTL auto flash mode is used when the remote flashlight 20 controls flashing in a non-TTL auto flash mode (in other words, when it controls a light amount of flash without being controlled by the camera).

Note that the configuration of the multiple flash photographing system shown in FIG. 2 is the same as those of second to fourth embodiments to be described later. The distance measuring section 23 and the photometry section 24 for non-TTL auto flash mode are indispensable only in the fourth embodiment, and need not be provided in the first to third embodiments. In the fourth embodiment, the photometry section 24 for non-TTL auto flash mode is used for calculating a reflection rate RH2 at the time of multiple flash photographing.

Figure 4:
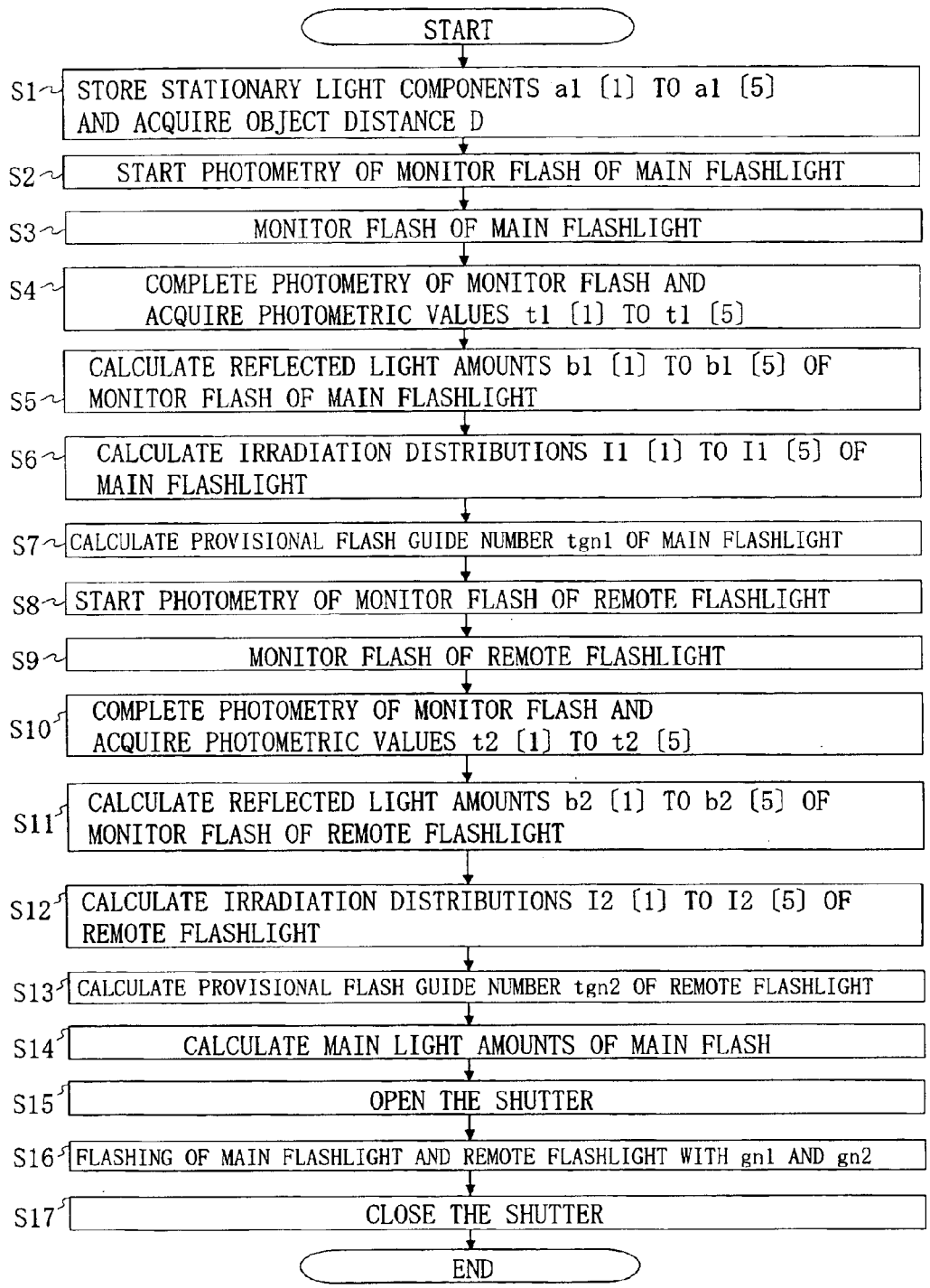
FIG. 4 is a flowchart showing the operation of a photographing system in a first embodiment.

FIG. 4 is a flowchart showing the operation of the multiple flash photographing system of this embodiment. Hereinafter, the operation of this embodiment will be explained in the order of the step numbers shown in the drawing. Note that the operation shown in FIG. 4 is executed under the control of the control device 6 and the control device 6 makes various kinds of calculations, unless described otherwise (this also applies to the later-described other embodiments).

Upon the press on a not-shown shutter release button, the photographing operation starts and the following steps are executed.

[Step S1]

Stationary light components a1[1] to a1[5] in the five regions 51 to 55 of the photometric sensor 5 are measured and stored, and an object distance D is acquired.

[Step S2]

The photometric sensor 5 starts the photometry of main monitor flash of the main flashlight 10.

[Step S3]

The main flashlight 10 emits the main monitor flash (main preflash). For this main monitor flash of the main flashlight 10, the main flash tube 12 flashes with a guide number p1 that is a predetermined small light amount. This guide number p1 is designated with the camera, or a value pre-set on the main flashlight 10 is transmitted to the camera.

[Step S4]

At the completion of the photometry of the main monitor flash, provisional photometric values (photometric values of main preflash) t1[1] to t1[5] of the five regions of the photometric sensor 5 are acquired.

[Step S5]

The stationary light components measured by the photometric sensor 5 immediately before or immediately after the main monitor flash of the main flashlight 10 are determined as a1[1] to a1[5]. Then, as shown in the following Expressions 1, the stationary light components a1[1] to a1[5] are subtracted from the respective photometric values t1[1] to t1[5] to calculate actual reflected light amounts b1[1] to b1[5] of the respective five regions at the main monitor flash of the main flashlight 10.

$$b1[1]=t1[1]-a1[1]$$
$$b1[2]=t1[2]-a1[2]$$
$$b1[3]=t1[3]-a1[3]$$
$$b1[4]=t1[4]-a1[4]$$
$$b1[5]=t1[5]-a1[5] \quad \text{(Expressions 1)}$$

[Step S6]

Irradiation distributions I1[1] to I1[5] of the main flashlight 10 are calculated. Here, on the basis of a region illuminated most by the main flashlight 10 (having the largest reflected light amount), the Irradiation distributions I1[1] to I1[5] are found as ratios of the reflected light amounts of the respective regions to the reflected light amount of the most illuminated region. First, it is assumed here that a main subject is present at a position closest to the camera. Then, a region with the largest reflected light amount therein is defined as a target adjustment region of the main flashlight 10. Specifically, a maximum reflected light amount b1 max is found by the Expression 2.

$$b1\text{MAX}=\text{MAX}(b1[1], b1[2], b1[3], b1[4], b1[5]) \quad \text{(Expression 2)}$$

Note that MAX ( ) is a function of returning the maximum value from the parenthesis.

The Irradiation distributions I1[1] to I1[5] of the respective regions of the main flashlight 10 are calculated by normalizing a found maximum reflected light amount b1max as in the following Expressions 3.

$$I1[1]=b1[1]/b1\text{MAX}$$
$$I1[2]=b1[2]/b1\text{MAX}$$

$$I1[3]=b1[3]/b1\text{MAX}$$

$$I1[4]=b1[4]/b1\text{MAX}$$

$$I1[5]=b1[5]/b1\text{MAX} \quad \text{(Expressions 3)}$$

[Step S7]

A guide number tgn1 is calculated as a provisional expected light amount of the main flashlight 10. Specifically, the provisional guide number tgn1 of the main flashlight 10 is found by the following expression so as to obtain a proper illumination amount for the previously determined target adjustment region of the main flashlight 10.

$$tgn1 = \sqrt{\frac{bj}{b1\text{MAX}}} \times p1 \quad \text{(Expression 4)}$$

Here, bj is a target photometric value. The target photometric value corresponds to a light amount for proper exposure for the subject and is set to a proper value in advance.

[Step S8]

The photometry of remote monitor flash of the remote flashlight 20 is started.

[Step S9]

The remote flashlight 20 emits remote monitor flash (remote preflash). For the remote monitor flash, the remote flash tube 22 flashes with a guide number p2 that is a predetermined small light amount.

[Step S10]

Upon the completion of the photometry of the remote monitor flash, provisional photometric values (photometric values of the remote preflash) t2[1] to t2[5] of the five regions of the photometric sensor 5 are acquired.

[Step S11]

Stationary light components measured by the photometric sensor 5 immediately before or immediately after the monitor flash of the remote flashlight 20 are determined as a2[1] to a2[5]. Then, as shown in the following Expressions 5, the stationary light components a2[1] to a2[5] are subtracted from the respective photometric values t2[1] to t2[5] to find actual reflected light amounts b2[1] to b2[5] of the five regions in the remote monitor flash. Note that the period between the completion of the main monitor flash and the start of the remote monitor flash is extremely short. Therefore, the stationary light components a1[1] to a1[5] already measured may be regarded as the stationary light components a2[1] to a2[5] for the calculation without newly measuring them.

$$b2[1]=t2[1]-a2[1]$$

$$b2[2]=t2[2]-a2[2]$$

$$b2[3]=t2[3]-a2[3]$$

$$b2[4]=t2[4]-a2[4]$$

$$b2[5]=t2[5]-a2[5] \quad \text{(Expressions 5)}$$

[Step S12]

Irradiation distributions I2[1] to I2[5] of the remote flashlight 20 are calculated. Here, the irradiation distributions I2[1] to I2[5] are found in the same manner as those of the main flashlight 10. Specifically, it is assumed that the main subject is at a position closest to the camera, and a region with the largest reflected light amount therein is defined as a target adjustment region of the remote flashlight 20. Then, a maximum reflected light amount b2max is found as in the following Expression 6.

$$b2\text{MAX}=\text{MAX}(b2[1], b2[2], b2[3], b2[4], b2[5]) \quad \text{(Expression 6)}$$

The irradiation distributions I2[1] to I2[5] of the respective regions are calculated by normalizing the reflected light amounts b2[1] to b2[5] with the maximum reflected light amount b2max as in the following Expressions 7.

$$I2[1]=b2[1]/b2\text{MAX}$$

$$I2[2]=b2[2]/b2\text{MAX}$$

$$I2[3]=b2[3]/b2\text{MAX}$$

$$I2[4]=b2[4]/b2\text{MAX}$$

$$I2[5]=b2[5]/b2\text{MAX} \quad \text{(Expressions 7)}$$

[Step S13]

A guide number tgn2 is calculated as a provisional expected light amount of the remote flashlight 20. Specifically, tgn2 of the remote flashlight 20 is found by the following Expression 8 so as to obtain a proper illumination amount for the previously determined target adjustment region of the remote flashlight 20.

$$tgn2 = \sqrt{\frac{bj}{b2\text{MAX}}} \times p2 \quad \text{(Expression 8)}$$

[Step S14]

Light amounts of the main flash are calculated here by decreasing the aforesaid provisional guide numbers for the correction, to obtain proper exposure even when the respective target adjustment regions of the main flashlight 10 and the remote flashlight 20 overlap with each other (even when the target adjustment regions are overlappingly illuminated by the respective flashlights).

Figure 5:
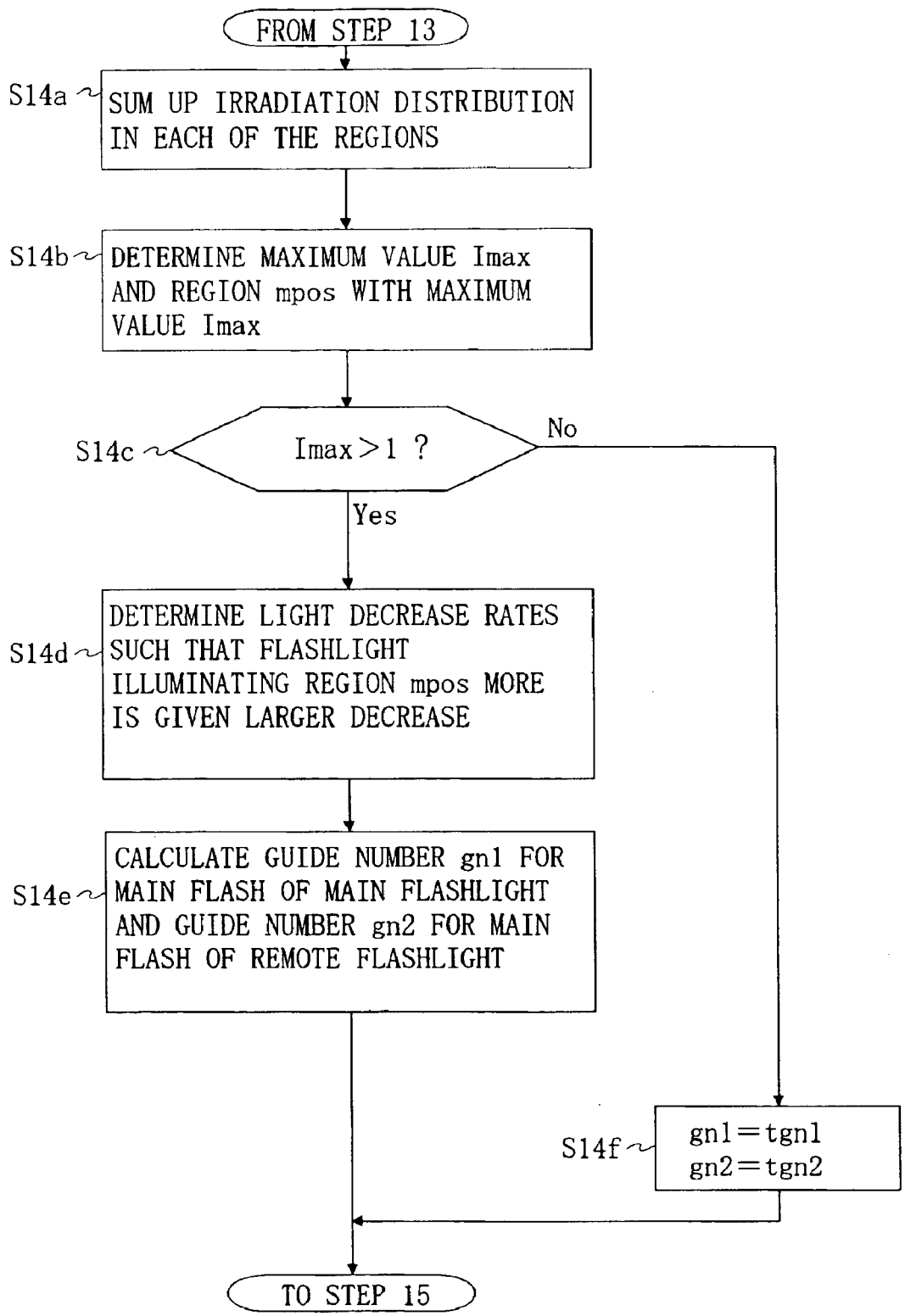
FIG. 5 is a flowchart showing the operation of calculating light amounts of main flash in the first embodiment.

FIG. 5 is a flowchart for calculating the light amounts of main flash in the first embodiment, in otherwords, details of Step S14. The Step S14 is dividable into the following Steps S14a to S14f.

[Step S14a]

As shown in the following Expressions 9, the irradiation distribution of the main flashlight 10 and that of the remote flashlight 20 in each of the regions are summed up.

$$I\text{sum}[1]=I1[1]+I2[1]$$

$$I\text{sum}[2]=I1[2]+I2[2]$$

$$I\text{sum}[3]=I1[3]+I2[3]$$

$$I\text{sum}[4]=I1[4]+I2[4]$$

$$I\text{sum}[5]=I1[5]+I2[5] \quad \text{(Expressions 9)}$$

The values of Isum [1] to Isum [5] thus found represent the illumination distributions when the main flashlight 10 and the remote flashlight 20 flash with the aforesaid guide numbers tgn1, tgn2 respectively. The value 1 of Isum [1] to Isum [5] signifies that a region is illuminated with proper exposure. The values larger than 1 of Isum [1] to Isum [5] signifies that the region is overexposed, while the values smaller than 1 signifies that the region is underexposed.

[Step S14b]

Based on the following Expression 10, a maximum value Imax among Isum [1] to Isum [5] and a region mpos with this maximum value are found.

$$Imax = MAX(Isum[1], Isum[2], Isum[3], Isum[4], Isum[5]) \quad \text{(Expression 10)}$$

[Step S14c]

It is judged whether or not the maximum value Imax exceeds 1. When the maximum value Imax exceeds 1, the flow goes to S14d, when not, the flow goes to S14f.

[Step S14d]

Decrease in light amounts (decrease rates) is determined such that the flashlight illuminating the region more is given a larger decrease amount. Specifically, dn is first calculated by the Expression 11, using Imax found in S14b.

$$dn = 1 - (1/Imax) \quad \text{(Expression 11)}$$

Next, the decrease rates of the main flashlight 10 and the remote flashlight 20 are found according to the dn. At this time, the decease rates are determined according to how much each of the main flashlight 10 and the remote flashlight 20 illuminates the region mpos whose sum of the irradiation distributions is largest, in other words, the decrease rates are determined so that the flashlight illuminating the region more is given a larger decrease. If the region mpos is, for example, a center portion 51, the decrease rates are calculated as follows.

$$Kdn1 = 1 - \{dn \times I1[1]/MAX(I1[1], I2[2])\}$$

$$Kdn2 = 1 - \{dn \times I2[1]/MAX(I1[1], I2[2])\} \quad \text{(Expressions 12)}$$

[Step S14e]

Kdn1 and Kdn2 are substituted in the following Expressions 13 to find a guide number gn1 that is the decreased provisional guide number tgn1 of the main flashlight 10 and a guide number gn2 that is the decreased provisional guide number tgn2 of the remote flashlight 20. The guide numbers gn1, gn2 are respective expected light amounts of the main flashlight 10 and the remote flashlight 20 at the time of photographing (main flashing).

$$gn1 = tgn1 \times \sqrt{Kdn1}$$

$$gn2 = tgn2 \times \sqrt{Kdn2} \quad \text{(Expressions 13)}$$

[Step S14f]

At Step S14f, there is no region where the maximum value Imax exceeds 1, therefore, no decrease in light amount is required. Accordingly, the provisional guide numbers tgn1, tgn2 are assumed to be the guide numbers gn1, gn2 at the time of photographing. Thereafter, the flow goes to Step S15 in FIG. 4.

[Step S15]

A shutter is released.

[Step S16]

The main flashlight 10 flashes with the guide number gn1 and the remote flashlight 20 flashes with the guide number gn2.

[Step S17]

The shutter is closed to finish multiple flash photographing. The description on the operation of this embodiment completes here.

The following description will be on the reason why the light amount is decreased according to how much each of the main flashlight 10 and the remote flashlight 20 illuminates the region mpos, in other words, why the decreasing is done such that the one illuminating the region more is given a larger decrease amount.

Figure 1:
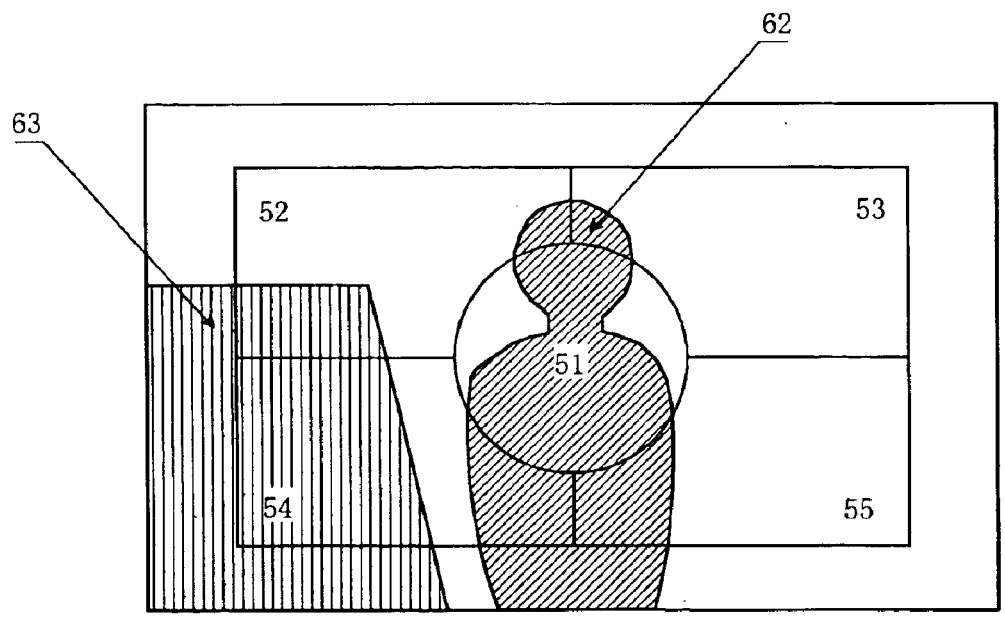
FIG. 1 is a view showing photometric regions and a focusing screen overlapping with each other.

In FIG. 1 previously described, it is assumed that the main flashlight 10 mainly illuminates the person 62 as the main subject, the remote flashlight 20 mainly illuminates the background 63, and each of the illumination thereof reaches both of the person 62 and the background 63. Then, it is also assumed that the main flashlight 10 illuminates the person 62 more than the remote flashlight 20.

At this time, in order to properly expose the person 62 in the conventional method, the guide numbers for the main flash are determined by decreasing the previously found provisional guide number tgn2 more than tgn1, or decreasing both of them by the same amount, or decreasing both of them at the same rate. This will result in underexposure of the background 63, though the person 62 is illuminated with the proper exposure. This is because the guide number of the remote flashlight 20 that is illuminating the background 63 decreases by a larger value.

In this embodiment, on the other hand, in such a case, the guide number of the remote flashlight 20 mainly illuminating the background 63 is set to a relatively large value, so that the effect of the illumination thereof to the background 63 is sufficiently obtained while the person 62 is shot with a proper exposure. This is because in this embodiment, the flashlight illuminating the main subject more is given a larger decrease.

Therefore, in multiple flash photographing using a plurality of flashlights, their light amounts are automatically determined in an optimum ratio irrespective of positional relationship of the flashlights. As a result, under any shooting condition it is made possible to easily take a picture with proper exposure in the entire field by multiple flash photographing.

Further, as is apparent from Expression 10, when a plurality of over-illuminated regions are present, the guide numbers for the main flash of the main flashlight 10 and the remote flashlight 20 are calculated so that the guide number of a region with the largest expected illumination amount is adjusted to a proper value. This accordingly can facilitate the calculation of the optimum amount of flash without increasing the load of the calculation.

<Second Embodiment>

Figure 6:
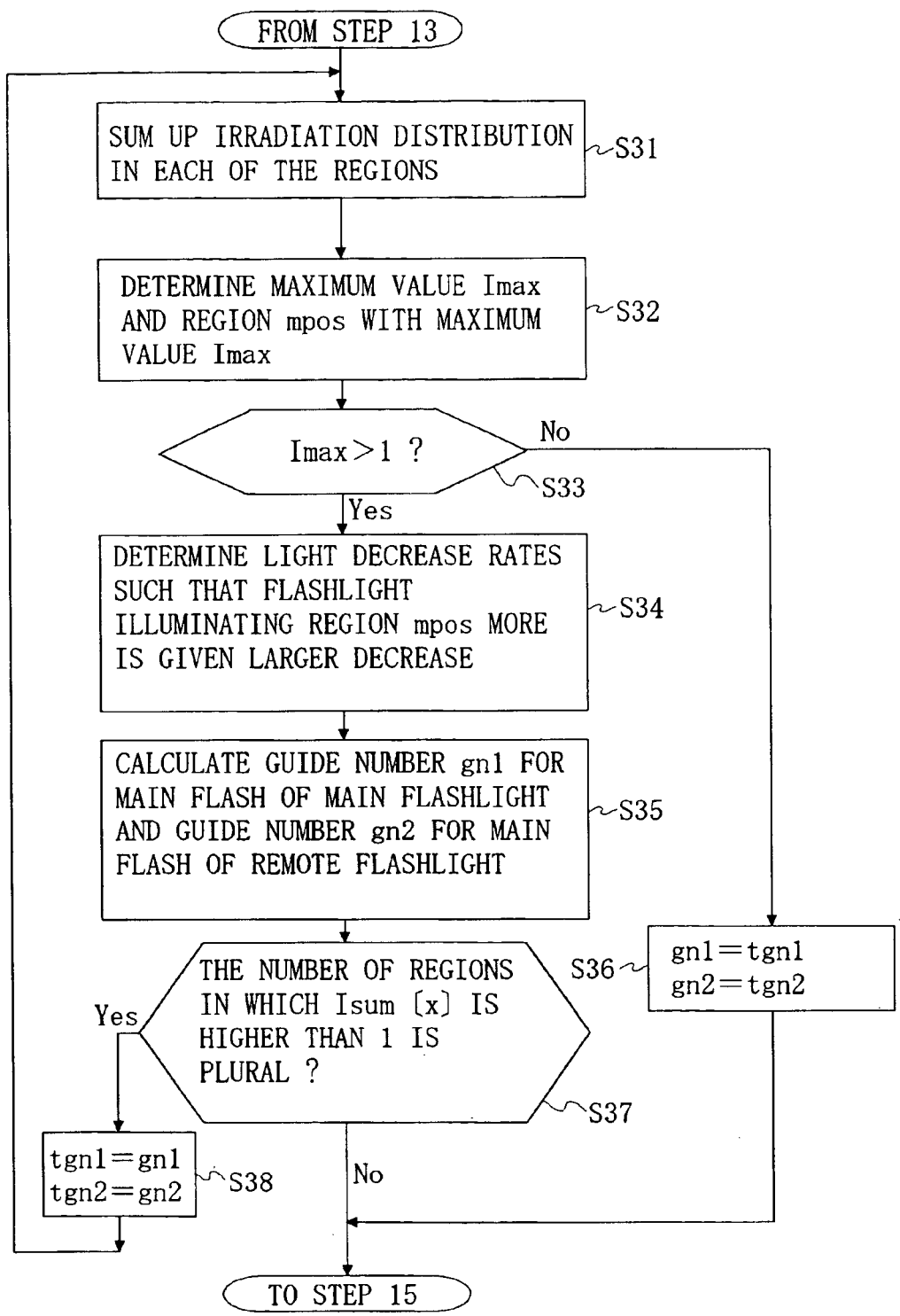
FIG. 6 is a flowchart showing the operation of calculating light amounts of main flash in a second embodiment.

FIG. 6 is a flowchart of the operation of calculating light amounts of main flash in the second embodiment.

The second embodiment is the same as the first embodiment except the operation of calculating the light amounts of main flash (Step S14), and therefore, description thereon will be omitted. Further, Steps S31 to S36 in FIG. 6 are the same as Steps S14a to S14f of the first embodiment respectively, and therefore, only Steps S37, S38 will be explained.

[Step S37]

It is judged whether or not there are a plurality of regions where the sums Isum [1] to Isum [5] of irradiation distributions found in Step S31 exceed 1. If the judgment result is positive, the flow goes to Step S38, while, if there is only one region where the value exceeds 1, the flow returns to Step S15 in FIG. 4.

[Step S38]

The regions where the values of Isum [1] to Isum [5] exceed 1 are overexposed regions unless the light amount is decreased. Therefore, in the first embodiment, when the value in the region with the largest value exceeds 1, the light amount is decreased so as to attain the proper exposure for this region. However, in the case when the number of regions where the values of Isum [1] to Isum [5] exceed 1 is plural, correcting only the largest Isum to a proper value (to Imax 1) does not always prevent the other regions from having the values exceeding 1 (from becoming overexposed).

Therefore, in this embodiment, when the number of regions where the values of Isum [1] to Isum [5] exceed 1 is plural, provisional guide numbers tgn1, tgn2 are corrected to (are made equal to) guide numbers gn1, gn2 found in Step S35 (tng1=gn1, tgn2=gn2).

Thereafter, the flow returns to Step S31, and the operation from Step S31 is executed again. When no region has the value exceeding 1 after repeating the operation, an overexposed region is eliminated. The description on the operation of this embodiment completes here.

As described above, in this embodiment, when there are a plurality of regions where the values of Isum [1] to Isum [5] exceed 1, the light amounts of main flash is repeatedly calculated. This can prevent occurrence of an overexposed region and attain a good photographic result.

<Third Embodiment>

Figure 7:
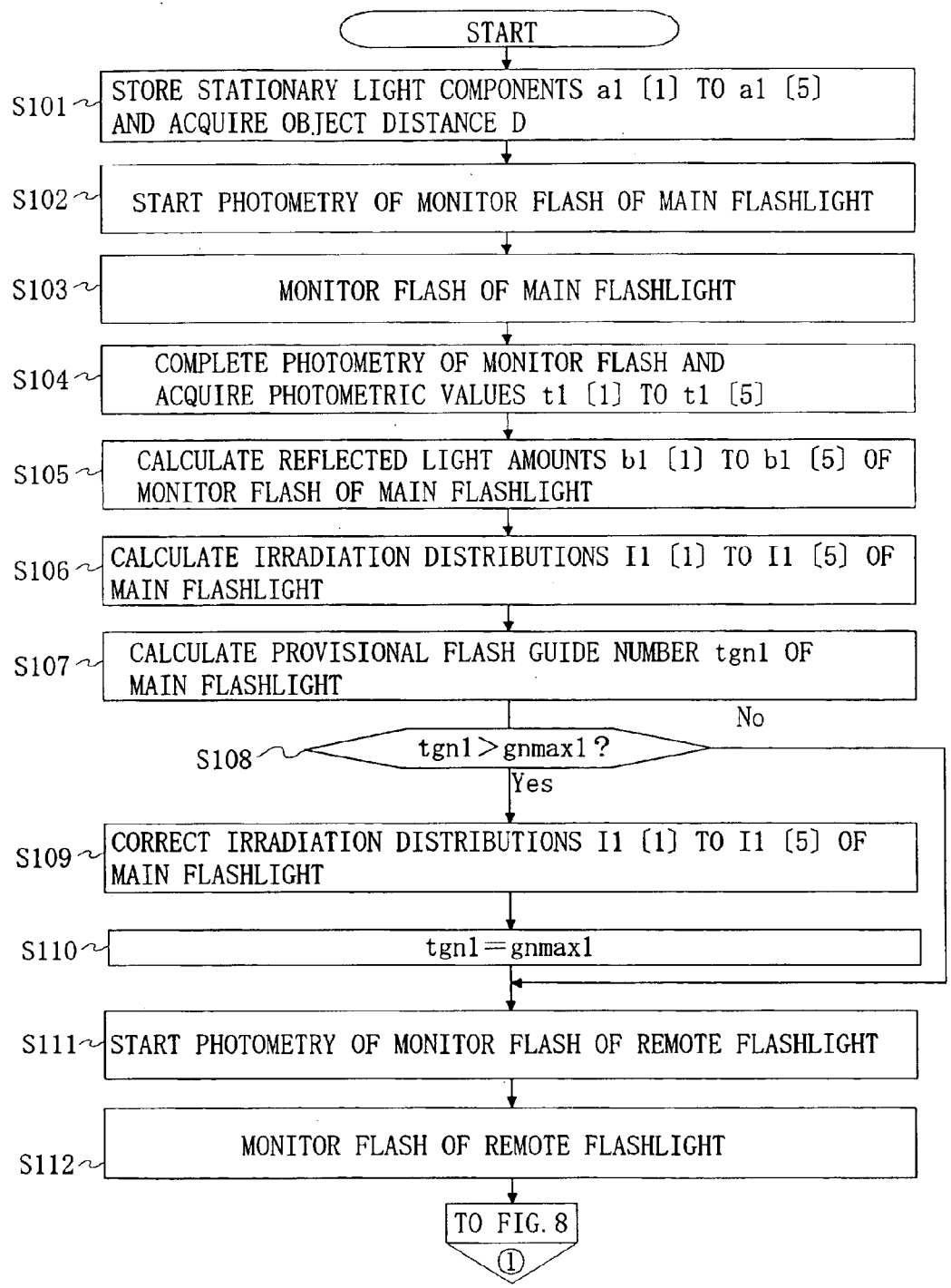
FIG. 7 is a flowchart showing the first half of the operation of a photographing system in a third embodiment.
Figure 8:
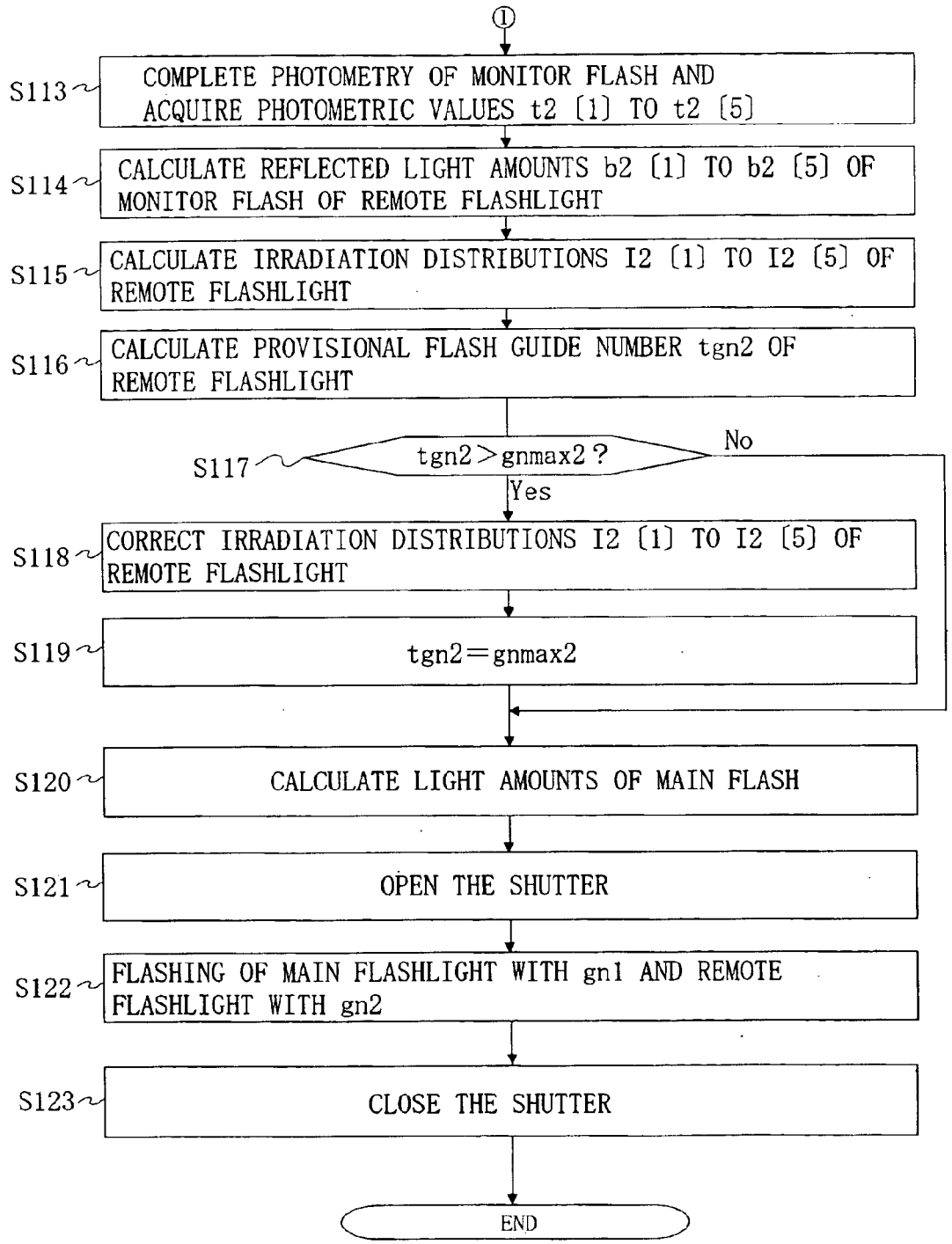
FIG. 8 is a flowchart showing the latter half of the operation of the photographing system in the third embodiment.

FIG. 7 and FIG. 8 are flowcharts of the operation of a photographing system in the third embodiment. In FIG. 7, Steps S101 to S107 are the same as Steps S1 to S7 of the first embodiment respectively. In FIG. 7 and FIG. 8, Steps S111 to S116 are the same as Steps S8 to S13 of the first embodiment respectively. In FIG. 8, Step S120 is the same as the entire processings of Steps S31 to S38 of the second embodiment. In FIG. 8, Steps S121 to S123 are the same as Steps S15 to S17 of the first embodiment respectively. Therefore, only Steps S108 to S110 and S117 to S119 that are different from the first and second embodiments will be explained.

[Step S108]

A maximum guide number gnmax1 as the maximum light amount of the main flashlight 10 is compared with a calculated provisional guide number tgn1. When tgn1 is larger than gnmax1, the flow goes to Step S109, when not, the flow goes to Step S111.

[Step S109]

At this step, the maximum light amount of the main flashlight 10 is smaller than the provisional guide number tgn1. Therefore, irradiation distributions I1[1] to I1[5]of the main flashlight 10 are corrected. Specifically, the calculation by the following Expressions 14 is executed to underestimate the irradiation distributions I1[1] to I1[5]according to the flash capability of the main flashlight 10.

$$I1[1]=I1[1]\times(gn\text{max}1/tgn1)^2$$

$$I1[2]=I1[2]\times(gn\text{max}1/tgn1)^2$$

$$I1[3]=I1[3]\times(gn\text{max}1/tgn1)^2$$

$$I1[4]=I1[4]\times(gn\text{max}1/tgn1)^2$$

$$I1[5]=I1[5]\times(gn\text{max}1/tgn1)^2 \quad \text{(Expressions 14)}$$

This correction adjusts the irradiation distributions I1[1] to I1[5] of the main flashlight 10 to proper values appropriate for the flash capability.

[Step S110]

gnmax1 is substituted for the guide number tgn1. This means that the provisional guide number is made equal to the maximum guide number of the main flashlight 10. Thereafter, Steps S111 to S116 are executed (similarly to Steps S8 to S13 of the first embodiment).

[Step S117]

A maximum guide number gnmax2 of the remote flashlight 20 and a calculated provisional guide number (provisional expected light amount of remote flash) tgn2 thereof are compared with each other. When the provisional guide number tgn2 is larger than the maximum guide number gnmax2, the flow goes to Step S118, when not, the flow goes to Step S120.

[Step S118]

At this step, the maximum light amount of the remote flashlight 20 is smaller than the provisional guide number tgn2. Therefore, irradiation distributions I2[1] to I2[5] of the remote flashlight 20 are corrected. Specifically, the calculation shown by the following Expressions 15 is executed to underestimate the irradiation distributions I2 [1] to I2 [5] according to the flash capability of the remote flashlight 20.

$$I2[1]=I2[1]\times(gn\text{max}2/tgn2)^2$$

$$I2[2]=I2[2]\times(gn\text{max}2/tgn2)^2$$

$$I2[3]=I2[3]\times(gn\text{max}2/tgn2)^2$$

$$I2[4]=I2[4]\times(gn\text{max}2/tgn2)^2$$

$$I2[5]=I2[5]\times(gn\text{max}2/tgn2)^2 \quad \text{(Expressions 15)}$$

This correction adjusts the irradiation distributions I2[1] to I2[5] of the remote flashlight 20 to proper values appropriate for the flash capability.

[Step S119]

The maximum guide number gnmax2 is substituted for the guide number tgn2. This means that the provisional guide number is made equal to the maximum guide number of the remote flashlight 20. The description on the operation of this embodiment completes here.

As described above, in this embodiment, the irradiation distributions are corrected according to the flash capability of the flashlights. In other words, the exposure is judged not based on the sum of the calculated irradiation distributions but on the irradiation distributions actually irradiatable. Therefore, even when the provisional guide number of at least one of the main flashlight 10 and the remote flashlight 20 exceeds their flash capability, photographing is made possible with a proper amount of flash. Further, even when the distance from a flashlight to a subject is long, and a small flashlight is used, underexposure can be prevented. Consequently, it is able to shoot with a proper exposure amount easily without the flash capability of a flashlight or the distance from the flashlight to a subject taken into consideration.

<Fourth Embodiment>

Figure 9:
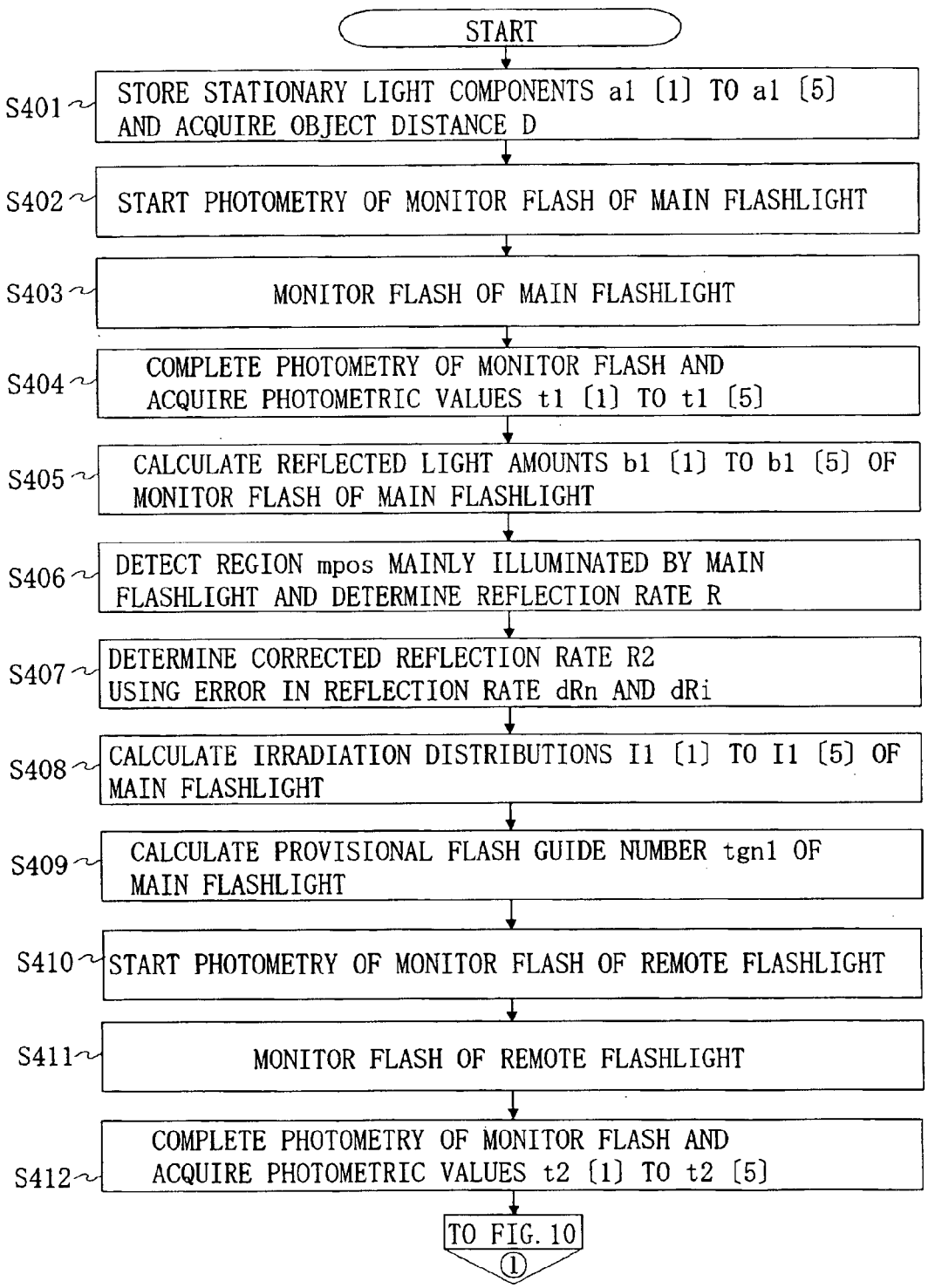
FIG. 9 a flowchart showing the first half of the operation of a photographing system in a fourth embodiment.
Figure 10:
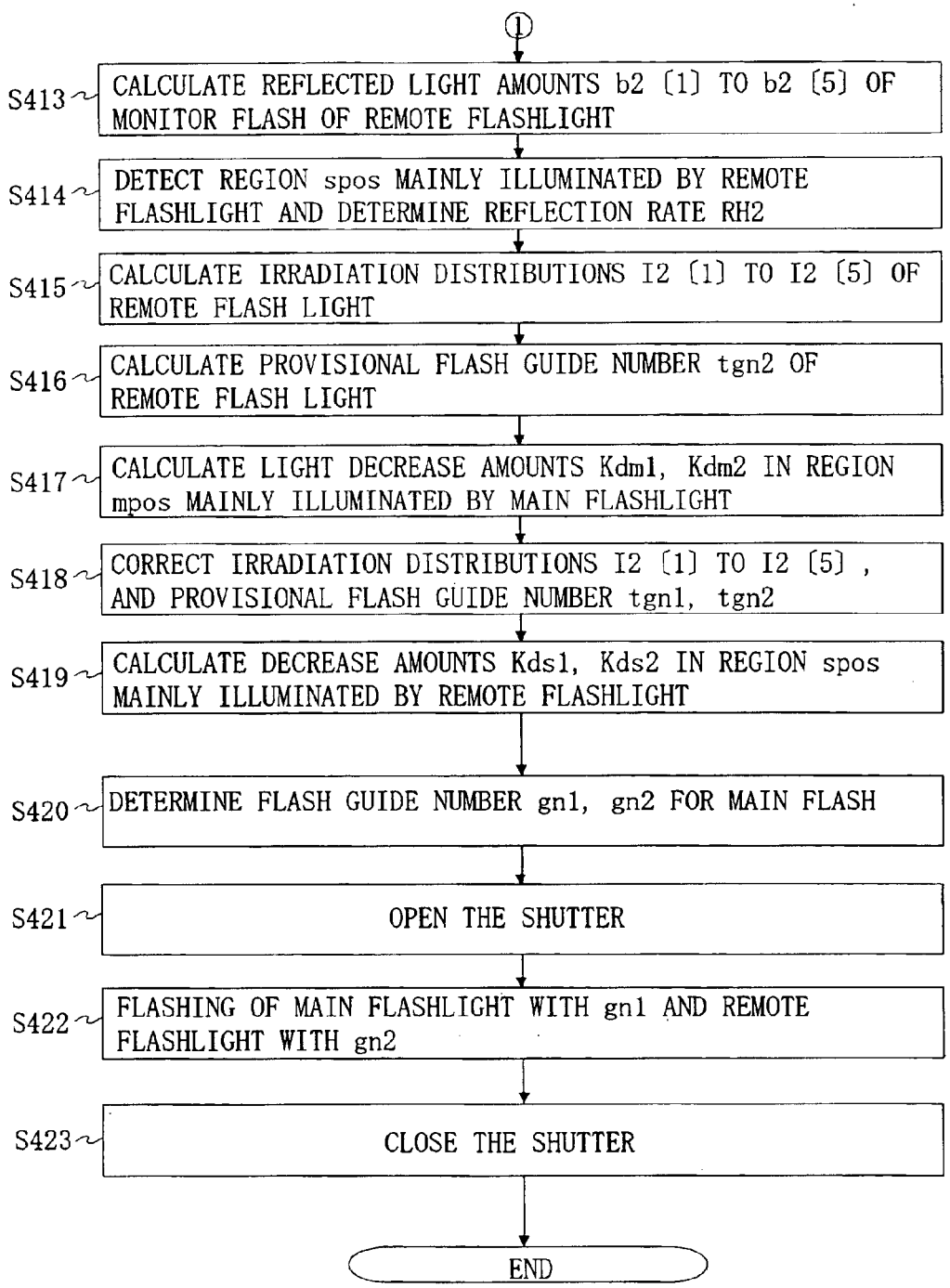
FIG. 10 is a flowchart showing the latter half of the operation of the photographing system in the fourth embodiment.
Figure 11:
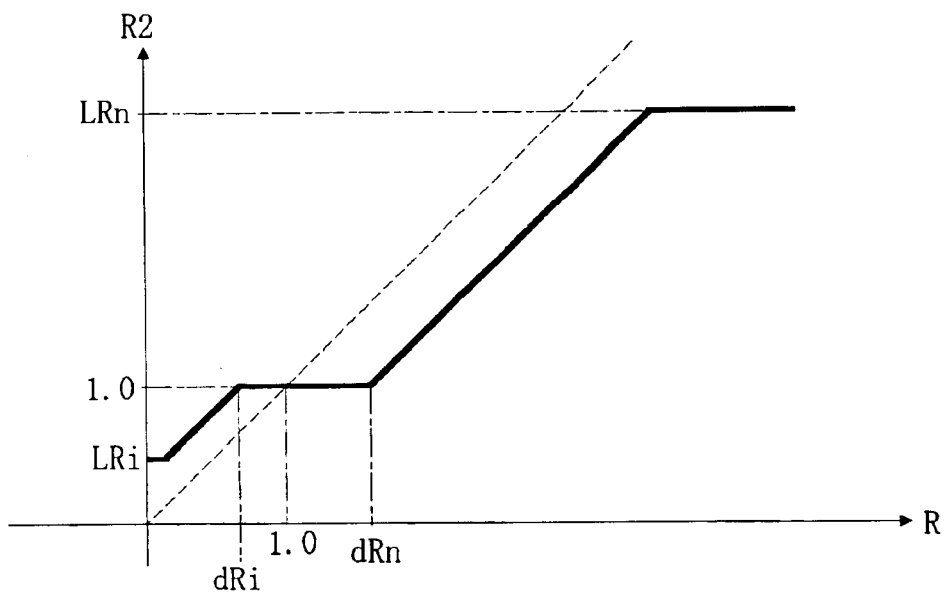
FIG. 11 is an explanatory chart of a calculation method of a corrected reflection rate R2.

FIG. 9 and FIG. 10 are flowcharts showing the operation of a photographing system in the fourth embodiment. In FIG. 9, Steps S401 to S405 are the same as Steps S1 to S5 of the first embodiment respectively, and Steps S410 to S413 are the same as Steps S8 to S11 of the first embodiment respectively. In FIG. 10, Steps S421 to S423 are the same as Steps S15 to S17 of the first embodiment respectively. Therefore, only Steps S406 to S409 and S414 to S420 that are different from the first embodiment will be explained. Note that in this embodiment, the distance measuring device 3 of the camera has a distance information inputting section through which a photographer inputs a value of an object distance.

[Step S406]

Detection of a region mpos mainly illuminated by the main flashlight 10 and calculation of a reflection rate R are performed in the following manner. First, it is assumed that a main subject is present at a position closest to the camera. Then, one of the five regions, whose reflected light amount (any one of b1[1] to b1[5]) is largest is defined as a region mpos mainly illuminated by the main flashlight 10. Therefore, a maximum reflected light amount b1max is found by the aforesaid Expression 2.

Next, based on an object distance D measured by the distance measuring device 3, an F number of the shooting lens, a guide number p1 of main monitor flash, and the maximum reflected light amount b1max, the reflection rate R of the region mpos mainly illuminated by the main flashlight 10 is found by the following Expression 16. Note that, when a user inputs the object distance to the distance information inputting section of the distance measuring device 3 of the camera, the value inputted is used instead of the object distance D measured by the distance measuring device 3.

$$R = K \times D^2 \times F^2 b1\text{MAX}/p1^2 \quad \text{(Expression 16)}$$

Here, a coefficient K is determined in advance so as to satisfy R=1.0 in case of a subject having a standard reflection rate. In a subject with a higher reflection rate than the standard rate, R is equal to 1 or higher, while, in a subject with a lower reflection rate, R is equal to 1 or lower. Further, an error in the measured object distance D causes an error in the calculated reflection rate R. Therefore, an error dRn or dRi of the reflection rate R is obtained by either one of the following Expressions 17.

$$dRn = (D/Dn)^2$$

$$dRi = (D/Di)^2 \quad \text{(Expressions 17)}$$

Here, Dn and Di are set in advance for each object distance D based on precision of a distance encoder in the shooting lens 1, distance measurement precision at the time of the execution of auto focusing, or the like. The error dRn is always equal to 1 or more. The error dRn occurs when the measured object distance D is longer than an actual object distance, and in this case, the calculated reflection rate R is overestimated than an actual reflection rate as is understood from Expression 16. Further, The error dRi is always equal to 1 or less. The error dRi occurs when the measured object distance D is shorter than the actual object distance, and in this case, the calculated reflection rate R is underestimated than the actual reflection rate.

[Step S407]

A corrected reflection rate R2 is calculated, using the error in reflection rate dRn and dRi which are determined depending on the object distance D. The corrected reflection rate R2 is obtained by correcting the reflection rate R. FIG. 111 is an chart for explaining a method of calculating the corrected reflection rate R2. As shown in the drawing, in the case of dRi≦R≦dRn, the corrected reflection rate R2 is set to 1.0. In the case of R>dRn, R2 is set to a value obtained by decreasing R by a difference between R and dRn. In the case of R<dR1, R2 is set to a value obtained by increasing R by a difference between R and dRn. Further, an upper limit value and a lower limit value of the corrected reflection rate R2 are set to LRn and LRi respectively.

[Step S408]

Irradiation distributions I1[1] to I1[5] of the main flashlight 10 are found by the following Expressions 18. Here, the irradiation distributions I1[1] to I1[5] are found as ratios of reflected light amounts of the respective regions to the maximum reflected light amount b1max of the region mpos mainly illuminated by the main flashlight 10.

$$I1[1] = \{b1[1]/b1\text{MAX}\} \times R2$$

$$I1[2] = \{b1[2]/b1\text{MAX}\} \times R2$$

$$I1[3] = \{b1[3]/b1\text{MAX}\} \times R2$$

$$I1[4] = \{b1[4]/b1\text{MAX}\} \times R2$$

$$I1[5] = \{b1[5]/b1\text{MAX}\} \times R2 \quad \text{(Expressions 18)}$$

[Step S409]

A guide number tgn1 is calculated as a provisional expected light amount of the main flashlight 10. Specifically, the guide number tgn1 of the main flashlight 10 is found by the following Expression 19 so as to obtain a proper amount of flash for the previously determined region mpos mainly illuminated by the main flashlight 10.

$$tgn1 = \sqrt{\frac{R2 \times bj}{b1\text{MAX}}} \times p1 \quad \text{(Expression 19)}$$

Thereafter, Steps S410 to S413 are executed (similarly to those of the aforesaid Steps S8 to S11), and the flow goes to Step S414. Note that the following two operations are also executed in addition to the same operations as those of Steps S8 to S11. Firstly, the distance measuring device 23 measures the distance between a subject and the remote flashlight 20 as DH. Secondly, the photometry section 24 for non-TTL auto flash mode measures each photometric value at the remote monitor flash as a reflected light amount BH.

[Step S414]

In this step, a region spos mainly illuminated by the remote flashlight 20 is detected and a reflection rate RH2 is found. First, a region, out of the five regions, where a reflected light amount (any one of b2[1] to b2[5]) is larges is defined as the region spos mainly illuminated by the remote flashlight 20. Then, a maximum reflected light amount b2max is found by the aforesaid Expression 6.

Next, based on the distance DH measured by the distance measuring device 23, a guide number p2 of monitor flash of the remote flashlight 20, and the reflected light amount BH obtained by the photometry section 24 for non-TTL auto flash mode, the reflection rate RH of the region spos mainly illuminated by the remote flashlight 20 is found by the following Expression 20.

$$RH = KH \times DH^2 \times BH/(p2)^2 \quad \text{(Expression 20)}$$

Here, a coefficient KH is determined in advance so as to satisfy RH=1.0 in a case of a subject having a standard reflection rate. Further, an error in the measured distance DH causes an error in the calculated reflection rate RH. Therefore, an error dRHn or dRHi of the reflection rate RH is found by either one of the following Expressions 21.

$$dRHn = (DH/DHn)^2$$

$$dRHi = (DH/DHi)^2 \quad \text{(Expressions 21)}$$

Here, DHn and DHi are set in advance for each measured distance DH in accordance with measurement precision of the distance measuring device 23 or the like. The error dRHn is always a value equal to 1 or more. The error dRHn occurs when the measured distance DH is longer than an actual object distance, and in this case, the calculated reflection rate RH is overestimated than an actual reflection rate as is understood from Expression 20. Further, the error dRHi is always a value equal to 1 or less. The error dRHi occurs when the measured distance DH is shorter than the actual object distance, and in this case, the calculated reflection rate RH is underestimated than the actual reflection rate.

Figure 12:
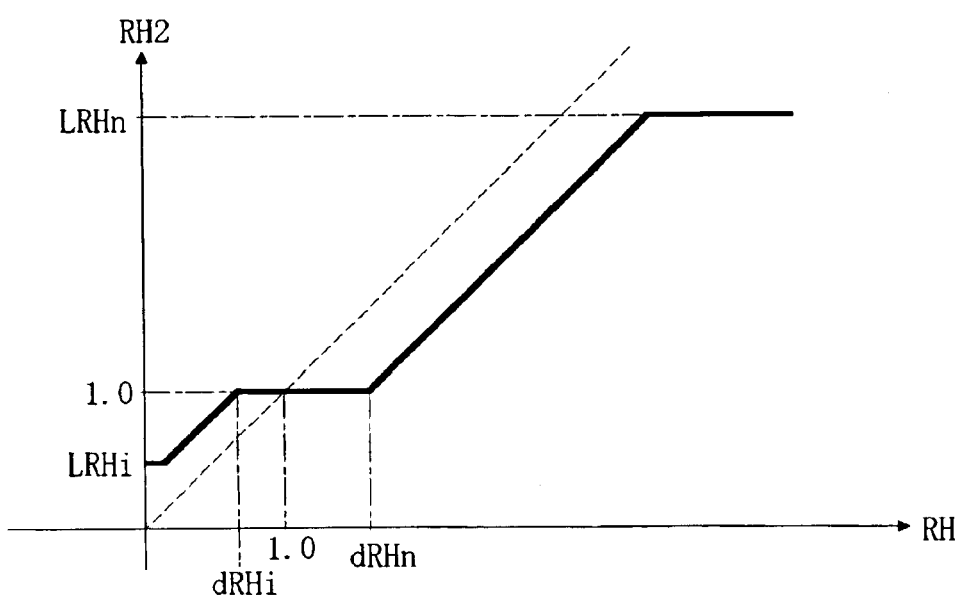
FIG. 12 is an explanatory chart of a calculation method of a corrected reflection rate RH2.

Next, a corrected reflection rate RH2 is calculated using the error in reflection rate dRHn and dRHi which are determined depending on the measured distance DH. The corrected reflection rate RH2 is obtained by correcting the reflection rate RH. FIG. 12 is a chart for explaining a method of calculating the corrected reflection rate RH2. As shown in the drawing, in the case of dRHi≦RH≦dRHn, the corrected reflection rate RH2 is set to 1.0. In the case of RH>dRHn, RH2 is set to a value obtained by decreasing RH by a difference between RH and dRHn. In the case of RH<dRHi, RH2 is set to a value obtained by increasing RH by the difference between RH and dRHn. Further, an upper limit value and a lower limit value of the corrected reflection rate RH2 are determined as LRHn and LRHi respectively.

[Step S41]

Irradiation distributions I2[1] to I2[5] of the remote flashlight 20 are found by the following Expressions 22.

$I2[1]=\{b2[1]/b2\text{MAX}\} \times RH2$ $I2[2]=\{b2[2]/b2\text{MAX}\} \times RH2$ $I2[3]=\{b2[3]/b2\text{MAX}\} \times RH2$ $I2[4]=\{b2[4]/b2\text{MAX}\} \times RH2$ $I2[5]=\{b2[5]/b2\text{MAX}\} \times RH2$ (Expressions 22)

[Step S416]

A guide number tgn2 is calculated as a provisional expected light amount of remote flash the remote flashlight 20. Specifically, the guide number tgn2 of the remote flashlight 20 is found by the following Expression 23 so as to obtain a proper amount of flash for the region spos mainly illuminated by the remote flashlight 20.

$$tgn2 = \sqrt{\frac{RH2 \times bj}{b2\text{MAX}}} \times p2 \qquad \text{(Expression 23)}$$

[Step S417]

Light decrease amounts Kdm1, Kdm2 of the provisional guide numbers are calculated so that proper exposure is attained even when the main flashlight 10 and the remote flashlight 20 overlappingly illuminate each of the target adjustment regions. First, the sums Isum [1] to Isum [5] of the irradiation distributions in the respective regions are obtained by the aforesaid Expressions 9.

Next, an excessive amount dm is calculated by the following Expression 24, using the sum Isum [mpos] in the region mpos mainly illuminated by the main flashlight 10. Note that when dm is less than 0 (zero), dm is assumed to be 0 (zero).

$dm=1-\{R2/I\text{sum}[mpos]\}$ (Expression 24)

The decrease rates Kdm1, Kdm2 of the main flashlight 10 and the remote flashlight 20 are found respectively according to how much the main flashlight 10 and the remote flashlight 20 illuminate the target adjustment region mpos. Specifically, the excessive amount dm is substituted in the Expressions 25.

$Kdm1=1-\{dm \times I1[mpos]/\text{MAX}(I1[mpos], I2[mpos])\}$ $Kdm2=1-\{dm \times I2[mpos]/\text{MAX}(I1[mpos], I2[mpos])\}$ (Expressions 25)

{Step S418}

Kdm1 and Kdm2 are substituted in the following Expressions 26 to correct, by decreasing, the provisional guide number tgn1 of the main flashlight 10 and the provisional guide number tgn2 of the remote flashlight 20.

$tgn1=tgn1 \times \sqrt{Kdm1}$ $tgn2=tgn2 \times \sqrt{Kdm2}$ (Expressions 26)

Further, Kdm1 and Kdm2 are substituted in the following Expressions 27 to correct, by decreasing, the irradiation distributions I1 of the main flashlight 10 and the irradiation distributions I2 of the remote flashlight 20.

$I1[1]=Kdm1 \times I1[1]$ $I1[2]=Kdm1 \times I1[2]$ $I1[3]=Kdm1 \times I1[3]$ $I1[4]=Kdm1 \times I1[4]$ $I1[5]=Kdm1 \times I1[5]$ $I2[1]=Kdm2 \times I2[1]$ $I2[2]=Kdm2 \times I2[2]$ $I2[3]=Kdm2 \times I2[3]$ $I2[4]=Kdm2 \times I2[4]$ $I2[5]=Kdm2 \times I2[5]$ (Expressions 27)

[Step S419]

Decrease amounts Kds1, Kds2 in the region spos mainly illuminated by the remote flashlight 20 are calculated. First, the irradiation distributions of the main flashlight 10 and of the remote flashlight 20 both corrected for each of the regions in Step S418 are summed up, using the aforesaid Expressions 9.

Next, the sum Isum [spos] of the irradiation distributions in the region spos mainly illuminated by the remote flashlight 20 is substituted in the following Expression 28 to find an excessive amount ds. Note that when ds is less than 0 (zero), ds is assumed to be 0 (zero).

$ds=1-\{1/I\text{sum}[spos]\}$ (Expression 28)

The decrease rate Kds1 of the main flashlight 10 and the decrease rate Kds2 of the remote flashlight 20 are found according to how much each of the main flashlight 10 and the remote flashlight 20 illuminates the region spos mainly illuminated by the remote flashlight 20. Specifically, the excessive amount ds is substituted in the following Expressions 29.

$Kds1=1-\{ds \times I1[spos]/\text{MAX}(I1[spos], I2[spos])\}$ $Kds2=1-\{ds \times I2[spos]/\text{MAX}(I1[spos], I2[spos])\}$ (Expressions 29)

[Step S420]

The guide number gn1 of a light amount of the main flashlight 10 for photographing and the guide number gn2 of a light amount of the remote flashlight 20 for photographing are found. Specifically, Kds1 and Kds2 are substituted in the following Expressions 30 to decrease the guide number tgn1 of the main flashlight 10 and the guide number tgn2 of the remote flashlight 20, thereby deriving the guide number gn1 and the guide number gn2 respectively.

$gn1=tgn1 \times \sqrt{Kds1}$ $gn2=tgn2 \times \sqrt{Kds2}$ (Expressions 30)

The description on the operation of this embodiment completes here. In this embodiment as described above, the distance measuring section 23 is provided in the remote flashlight 20, so that it is possible to accurately obtain the information on a distance from a flash device provided at a position apart from a camera body to a subject. Further, the distance DH obtained by the distance measuring section 23 is used for calculating the reflection rate of a subject together with the reflected light amount BH obtained at the time of the remote preflash using the photometry section 24 for non-TTL auto flash mode.

Therefore, it is possible to accurately calculate the reflection rate of the subject illuminated by the remote flashlight 20. Consequently, in multiple flash photographing that uses a plurality of flashlights, the light amounts are automatically determined in an optimum light amount ratio regardless of the positional relationship of the flashlights. As a result, it is possible to obtain good photographic results with reliability and with ease.

Moreover, with the provision of the distance measuring device 3 in the shooting lens 1, it is possible to obtain accurate distance information even when a main flash device has no distance measuring section. Further, the distance measuring device 3 has the distance information inputting section through which a photographer inputs an arbitrary value. This makes it possible to obtain good photographic results regardless of whether or not a distance measuring function is provided.

Of the provisional expected light amounts of the main flashlight 10 (the guide number tgn1) and the remote flashlight 20 (the guide number tgn2), the one illuminating an over-illuminated region more (a region where an irradiation amount exceeds a proper value) is given a larger decrease. In this manner, the expected light amounts of the main flashlight 10 and the remote flashlight 20 are corrected so that an expected illumination amount of the over-illuminated region is adjusted to a proper value. Therefore, even when the flash devices overlappingly illuminate the regions, the light emission of each of the flash devices can be made in an optimum light amount ratio.

<Supplementary Items of the Present Invention>

[1] In the examples described in the first to fourth embodiments, the two flashlights, namely, the main flashlight 10 and the remote flashlight 20 are used. The present invention is not to be limited thereto. For example, the number of the remote flashlights may be increased.

[2] In the example described in the fourth embodiment, the distance between the main flashlight 10 and the subject is measured by the distance measuring device 3, and the distance between the remote flashlight 20 and the subject is measured by the distance measuring section 23. The present invention is not to be limited to such an embodiment. For example, an independent distance measuring section may also be provided in the main flashlight. Further, the remote flashlight may be configured to include a similar section to which a photographer can input an arbitrary distance.

Note that the distance between the remote flashlight and a subject does not have to be the same as the object distance D measured by the camera since the remote flashlight is often installed apart from the camera. Therefore, in a case where the remote flashlight has no distance measuring section, the correction in the reflection rate may not be performed.

The invention is not limited to the above embodiments and various modifications may be made without departing from the spirit and scope of the invention. Any improvement may be made in part or all of the components.

What is claimed is:

1. A camera controlling a main flash device and a remote flash device to perform multiple flash photographing, the main flash device illuminating a subject and emitting a preflash prior to a main flash, the remote flash device illuminating the subject from a position different from a position of the main flash device and emitting a preflash prior to a main flash, the camera comprising:

a photometry section outputting a photometric value of each of a plurality of divided photometric regions that are formed by dividing a field;

a provisional flash amount calculating section calculating a provisional expected light amount of the main flash device based on the photometric value that is obtained by said photometry section at the time the main flash device pre-flashes, and calculating a provisional expected light amount of the remote flash device based on the photometric value that is obtained by said photometry section at the time the remote flash device pre-flashes; and a main flash amount calculating section summing up the provisional expected light amounts of the main and remote flash devices to calculate an expected illumination amount for each of the divided photometric regions; judging whether or not there is an over-illuminated region, among the divided photometric regions, in which the expected illumination amount exceeds a proper illumination amount; and if a result of the judgment is positive, calculating expected light amounts of the main flashes of the main and remote flash devices by decreasing the provisional expected light amounts of the main and remote flash devices, the decreasing being done such that of the two flash devices, the one illuminating the over-illuminated region more is given a larger decrease, and that the expected illumination amount for the over-illuminated region is to be the proper illumination amount.

2. The camera according to claim 1, wherein when there are a plurality of over-illuminated regions, said main flash amount calculating section calculates the expected light amounts of the main flashes of the main and remote flash devices so that an illumination amount of an over-illuminated region whose expected illumination amount is largest is to be the proper illumination amount.

3. The camera according to claim 2, wherein when there are a plurality of over-illuminated regions, said main flash amount calculating section calculates the expected light amounts of the main flashes of the main and remote flash devices, and thereafter repeats the calculation by using the calculated expected light amounts as the provisional expected light amounts until the result of the judgment turns negative.

4. The camera according to claim 3, wherein when a maximum light amount of the main flash device is smaller than the provisional expected light amount thereof, said provisional flash amount calculating section underestimates the photometric value obtained at the time the main flash device pre-flashes, according to a difference between the maximum and the provisional expected light amounts, and corrects the provisional expected light amount to the maximum light amount.

5. The camera according to claim 4, wherein when a maximum light amount of the remote flash device is smaller than the provisional expected light amount thereof, said provisional flash amount calculating section underestimates the photometric value obtained at the time the remote flash device pre-flashes, according to a difference between the maximum and the provisional expected light amounts, and corrects the provisional expected light amount to the maximum light amount.

6. The camera according to claim 1, wherein
when there are a plurality of over-illuminated regions, said main flash amount calculating section calculates the expected light amounts of the main flashes of the main and remote flash devices, and thereafter repeats the calculation by using the calculated expected light amounts as the provisional expected light amounts until the result of the judgment turns negative.

7. The camera according to claim 1, wherein
when a maximum light amount of the main flash device is smaller than the provisional expected light amount thereof, said provisional flash amount calculating section underestimates the photometric value obtained at the time the main flash device pre-flashes, according to a difference between the maximum and the provisional expected light amounts, and corrects the provisional expected light amount to the maximum light amount.

8. The camera according to claim 1, wherein
when a maximum light amount of the remote flash device is smaller than the provisional expected light amount thereof, said provisional flash amount calculating section underestimates the photometric value obtained at the time the remote flash device pre-flashes, according to a difference between the maximum and the provisional expected light amounts, and corrects the provisional expected light amount to the maximum light amount.

9. A multiple flash photographing system comprising:
a main flash device illuminating a subject and emitting a preflash prior to a main flash;
a remote flash device illuminating the subject from a position different from a position of said main flash device and emitting a preflash prior to a main flash;
a photometry section outputting a photometric value of each of a plurality of divided photometric regions that are formed by dividing a field;
a provisional flash amount calculating section calculating a provisional expected light amount of the main flash device based on the photometric value that is obtained by said photometry section at the time the main flash device pre-flashes, and calculating a provisional expected light amount of the remote flash device based on the photometric value that is obtained by said photometry section at the time the remote flash device pre-flashes; and
a main flash amount calculating section summing up the provisional expected light amounts of the main and remote flash devices to calculate an expected illumination amount for each of the divided photometric regions; judging whether or not there is an over-illuminated region, among the divided photometric regions, in which the expected illumination amount exceeds a proper illumination amount; and if a result of the judgment is positive, calculating expected light amounts of the main flashes of the main and remote flash devices by decreasing the provisional expected light amounts of the main and remote flash devices, the decreasing being done such that of the two flash devices, the one illuminating the over-illuminated region more is given a larger decrease, and that the expected illumination amount for the over-illuminated region is to be the proper illumination amount.

10. The multiple flash photographing system according to claim 9, wherein
when there are a plurality of over-illuminated regions, said main flash amount calculating section calculates the expected light amounts of the main flashes of the main and remote flash devices so that the illumination amount of an over-illuminated region whose expected illumination amount is largest is to be the proper illumination amount.

11. The multiple flash photographing system according to claim 10, wherein
when there are a plurality of over-illuminated regions, said main flash amount calculating section calculates the expected light amounts of the main flashes of the main and remote flash devices, and thereafter repeats the calculation by using the calculated expected light amounts as the provisional expected light amounts until the result of the judgment turns negative.

12. The multiple flash photographing system according to claim 11, wherein
when a maximum light amount of the main flash device is smaller than the provisional expected light amount thereof, said provisional flash amount calculating section underestimates the photometric value obtained at the time the main flash device pre-flashes, according to a difference between the maximum and the provisional expected light amounts, and corrects the provisional expected light amount to the maximum light amount.

13. The multiple flash photographing system according to claim 12, wherein
when a maximum light amount of the remote flash device is smaller than the provisional expected light amount thereof, said provisional flash amount calculating section underestimates the photometric value obtained at the time the remote flash device pre-flashes, according to a difference between the maximum and the provisional expected light amounts, and corrects the provisional expected light amount to the maximum light amount.

14. The multiple flash photographing system according to claim 9, wherein
when there are a plurality of over-illuminated regions, said main flash amount calculating section calculates the expected light amounts of the main flashes of the main and remote flash devices, and thereafter repeats the calculation by using the calculated expected light amounts as the provisional expected light amounts until the result of the judgment turns negative.

15. The multiple flash photographing system according to claim 9, wherein
when a maximum light amount of the main flash device is smaller than the provisional expected light amount thereof, said provisional flash amount calculating section underestimates the photometric value obtained at the time the main flash device pre-flashes, according to a difference between the maximum and the provisional expected light amounts, and corrects the provisional expected light amount to the maximum light amount.

16. The multiple flash photographing system according to claim 9, wherein
when a maximum light amount of the remote flash device is smaller than the provisional expected light amount thereof, said provisional flash amount calculating section underestimates the photometric value obtained at the time the remote flash device pre-flashes, according to a difference between the maximum and the provisional expected light amounts, and corrects the provisional expected light amount to the maximum light amount.

17. A multiple photographing system configured to control a main flash device and a remote flash device to perform multiple flash photographing, the main flash device illuminating a subject and emitting a preflash prior to a main flash, the remote flash device illuminating the subject from a position different from a position of said main flash device and emitting a preflash prior to a main flash, the multiple photographing system comprising:

a distance information acquiring section acquiring information on a distance from said main flash device to the subject;

a photometry section outputting a photometric value of each of a plurality of divided photometric regions that are formed by dividing a field;

an expected flash amount calculating section calculating an expected light amount of the main flash device based on the distance information and the photometric value that is obtained by said photometry section at the time the main flash device pre-flashes, and calculating an expected light amount of the remote flash device based on the photometric value that is obtained by said photometry section at the time the remote flash device pre-flashes.

18. The multiple flash photographing system according to claim 17, wherein:

said distance information acquiring section acquires information on a distance from said remote flash device to the subject; and said expected flash amount calculating section uses the information on a distance from said remote flash device to the subject when calculating the expected light amount of said remote flash device.

19. The multiple flash photographing system according to claim 18, wherein said distance information acquiring section has a distance measuring section provided in said main flash device and a distance measuring section provided in said remote flash device.

20. The multiple flash photographing system according to claim 19, wherein said expected flash amount calculating section calculates a reflection rate of the subject based on the distance information acquired by said distance information acquiring section and on the photometric value obtained at the time said main flash device pre-flashes, and corrects the expected light amount of said main flash device according to the reflection rate of the subject.

21. The multiple flash photographing system according to claim 20, wherein said expected flash amount calculating section calculates a reflection rate of the subject based on the distance information acquired by said distance information acquiring section and on the photometric value obtained at the time said remote flash device pre-flashes, and corrects the expected light amount of said remote flash device according to the reflection rate of the subject.

22. The multiple flash photographing system according to claim 21, wherein said distance information acquiring section has a lens position measuring section provided in a shooting lens.

23. The multiple flash photographing system according to claim 22, wherein said distance information acquiring section has a distance information inputting section to which a photographer inputs an arbitrary value.

24. The multiple flash photographing system according to claim 23, wherein said expected flash amount calculating section sums up the expected light amounts of the main and remote flash devices to calculate an expected illumination amount for each of the divided photometric regions; judges whether or not there is an over-illuminated region, among the divided photometric regions, in which the expected illumination amount exceeds a proper illumination amount; and if a result of the judgment is positive, corrects the expected light amounts of the main flashes of the main and remote flash devices by decreasing them, the decreasing being done such that of the two flash devices, the one illuminating the over-illuminated region more is given a larger decrease, and that the expected illumination amount for the over-illuminated region is to be the proper illumination amount.

25. The multiple flash photographing system according to claim 17, wherein said distance information acquiring section has a distance measuring section provided in said main flash device and a distance measuring section provided in said remote flash device.

26. The multiple flash photographing system according to claim 17, wherein said expected flash amount calculating section calculates a reflection rate of the subject based on the distance information acquired by said distance information acquiring section and the photometric value obtained at the time said main flash device pre-flashes, and corrects the expected light amount of said main flash device according to the reflection rate of the subject.

27. The multiple flash photographing system according to claim 17, wherein said expected flash amount calculating section calculates a reflection rate of the subject based on the distance information acquired by said distance information acquiring section and the photometric value obtained at the time said remote flash device pre-flashes, and corrects the expected light amount of said remote flash device according to the reflection rate of the subject.

28. The multiple flash photographing system according to claim 17, wherein said distance information acquiring section has a lens position measuring section provided in a shooting lens.

29. The multiple flash photographing system according to claim 17, wherein said distance information acquiring section has a distance information inputting section to which a photographer inputs an arbitrary value.

30. The multiple flash photographing system according to claim 17, wherein said expected flash amount calculating section sums up the expected light amounts of the main and remote flash devices to calculate an expected illumination amount for each of the divided photometric regions; judges whether or not there is an over-illuminated region, among the divided photometric regions, in which the expected illumination amount exceeds a proper illumination amount; and if a result of the judgment is positive, corrects the expected light amounts of the main flashes of the main and remote flash devices by decreasing them, the decreasing being done such that of the two flash devices, the one illuminating the over-illuminated region more is given a larger decrease, and that the expected illumination amount for the over-illuminated region is to be the proper illumination amount.

31. A multiple photographing system configured to control a main flash device and a remote flash device to perform multiple flash photographing, the main flash device illuminating a subject and emitting a preflash prior to a main flash, the remote flash device illuminating the subject from a position different from a position of said main flash device and emitting a preflash prior to a main flash, the multiple photographing system comprising:

a distance information acquiring section acquiring information on a distance from said remote flash device to the subject;

a photometry section outputting a photometric value of each of a plurality of divided photometric regions that are formed by dividing a field;

an expected flash amount calculating section calculating an expected light amount of the main flash device based on the photometric value that is obtained by said photometry section at the time the main flash device pre-flashes, and calculating an expected light amount of the remote flash device based on the distance information and the photometric value that is obtained by said photometry section at the time the remote flash device pre-flashes.

32. The multiple flash photographing system according to claim 31, wherein said expected flash amount calculating section sums up the expected light amounts of the main and remote flash devices to calculate an expected illumination amount for each of the divided photometric regions; judges whether or not there is an over-illuminated region, among the divided photometric regions, in which the expected illumination amount exceeds a proper illumination amount; and if a result of the judgment is positive, corrects the expected light amounts of the main flashes of the main and remote flash devices by decreasing them, the decreasing being done such that of the two flash devices, the one illuminating the over-illuminated region more is given a larger decrease, and that the expected illumination amount for the over-illuminated region is to be the proper illumination amount.

* * * * *